(12) United States Patent
Yamamoto et al.

(10) Patent No.: US 11,668,662 B2
(45) Date of Patent: Jun. 6, 2023

(54) SAMPLE ANALYSIS APPARATUS AND METHOD

(71) Applicant: JEOL Ltd., Tokyo (JP)

(72) Inventors: Yasuaki Yamamoto, Tokyo (JP); Takanori Murano, Tokyo (JP)

(73) Assignee: JEOL Ltd., Tokyo (JP)

( * ) Notice: Subject to any disclaimer, the term of this patent is extended or adjusted under 35 U.S.C. 154(b) by 187 days.

(21) Appl. No.: 17/381,571

(22) Filed: Jul. 21, 2021

(65) Prior Publication Data

US 2022/0026377 A1    Jan. 27, 2022

(30) Foreign Application Priority Data

Jul. 27, 2020 (JP) .............................. JP2020-126570

(51) Int. Cl.
*G01N 23/2252* (2018.01)
*G01N 23/2209* (2018.01)

(52) U.S. Cl.
CPC ..... *G01N 23/2252* (2013.01); *G01N 23/2209* (2018.02); *G01N 2223/079* (2013.01)

(58) Field of Classification Search
CPC ........... G01N 23/2252; G01N 23/2209; G01N 2223/079
USPC ................................................ 250/306, 307
See application file for complete search history.

(56) References Cited

U.S. PATENT DOCUMENTS

| | | | |
|---|---|---|---|
| 2009/0080289 A1* | 3/2009 | Wiley | G01V 1/30 367/49 |
| 2011/0104987 A1 | 5/2011 | David et al. | |
| 2015/0160649 A1 | 6/2015 | David et al. | |
| 2015/0270094 A1 | 9/2015 | Ikku | |
| 2018/0113440 A1 | 4/2018 | David et al. | |
| 2019/0025208 A1 | 1/2019 | Horigome et al. | |
| 2020/0191733 A1 | 6/2020 | Murano | |

FOREIGN PATENT DOCUMENTS

| | | |
|---|---|---|
| EP | 2546638 A2 | 1/2013 |
| EP | 3648137 A1 | 5/2020 |
| JP | 200658046 A | 3/2006 |
| JP | 201138939 A | 2/2011 |
| JP | 2016215333 A | 12/2016 |
| JP | 201814512 A | 1/2018 |

(Continued)

OTHER PUBLICATIONS

Extended European Search Report issued in EP21187271.8 dated Dec. 3, 2021.

(Continued)

*Primary Examiner* — Kiet T Nguyen
(74) *Attorney, Agent, or Firm* — The Webb Law Firm (57) ABSTRACT

Characteristic X-rays (soft X-rays) from a sample are detected using a spectroscope to thereby generate a plurality of intensity spectrums arranged in order of time sequence. A contour map creation unit creates a contour map by converting, in accordance with a color conversion condition, the plurality of intensity spectrums into a plurality of one-dimensional maps, and arranging the plurality of one-dimensional maps in order of time sequence. When displaying the contour map, a waveform array and a difference contour map may also be displayed. Based on the contour map, a timepoint at which a state change occurs in the sample is determined.

12 Claims, 4 Drawing Sheets

(56) References Cited

FOREIGN PATENT DOCUMENTS

| | | |
|---|---|---|
| JP | 201920362 A | 2/2019 |
| JP | 2019200126 A | 11/2019 |
| JP | 202098156 A | 6/2020 |

OTHER PUBLICATIONS

Office Action issued in JP2020126570 dated Jun. 14, 2022.
Ninomiya et al., Observation of Chemical State for Interstitial Solid Solution of Carbon-in Low-carbon Steel by Soft X-ray Absorption Spectroscopy, Tetsu-to-Hagane, The Iron and Steel Institute of Japan, 2018, vol. 104, No. 11.

* cited by examiner

SAMPLE ANALYSIS APPARATUS AND METHOD

CROSS REFERENCE TO RELATED APPLICATION

This application claims priority to Japanese Patent Application No. 2020-126570 filed Jul. 27, 2020, the disclosure of which is hereby incorporated by reference in its entirety.

BACKGROUND OF THE INVENTION

Field of the Invention

The present disclosure relates to a sample analysis apparatus and method, and more particularly to a technology of visualizing a state change of a sample.

Description of Related Art

There are known techniques for performing elemental analysis of a sample by irradiating electrons or an X-ray on the sample and detecting electromagnetic waves generated from the sample.

An example of such a technique is one in which, using an electron microscope, a sample is irradiated with an electron beam in the form of a charged particle beam, and characteristic X-rays emitted from the sample are spectrally dispersed. In this technique, elemental analysis is performed utilizing correlations between the characteristic X-rays and specific elements constituting the sample. An intensity spectrum of the characteristic X-rays indicates the numbers of times X-rays are detected for the respective energies. Based on the peak energies in the intensity spectrum, the elements contained in the sample are identified. Further, based on the areas of the peaks in the intensity spectrum, the element contents are determined. According to wavelength dispersive X-ray spectroscopy, the characteristic X-rays are spectrally dispersed by a diffraction grating to thereby generate the intensity spectrum. In this regard, there also exists a technology of using a CCD camera to collectively detect the spatially spread-out characteristic X-rays emanated from the diffraction grating.

Document 1 (Kakeru Ninomiya, et al., Observation of Chemical State for Interstitial Solid Solution of Carbon in Low-carbon Steel by Soft X-ray Absorption Spectroscopy, Tetsu-to-Hagane, Vol. 104, No. 11, The Iron and Steel Institute of Japan, 2018) discloses a technique of analyzing an intensity spectrum of characteristic X-rays. According to this technique, a plurality of characteristic X-ray spectrums are obtained from a plurality of low-carbon steel samples which have been subjected to different thermal treatments, and those spectrums are shown while being arranged next to each other (see FIG. 4(a) of Document 1). Further, differences between those characteristic X-ray spectrums are calculated. Meanwhile, Document 1 does not disclose any two-dimensional map having a wavelength axis and a time axis.

During a measurement process for performing analysis of a sample, the sample may undergo a state change which cannot be ignored or which has an effect on the analysis. For example, when the sample is continuously irradiated with an electron beam or X-ray, at a certain timepoint, a state of bonding of molecules, crystal structure, or the like may suddenly change in the sample. In other words, in the sample, a state change which has an effect on the analysis may occur abruptly. In particular, it is observed that, as compared with an inorganic sample, an organic sample tends to be more susceptible to thermal damages due to electron beam heating or the like.

In order to perform a sample analysis at high accuracy, it is desired to analyze a sample before any state change occurs in the sample. Generally, an intensity spectrum to be obtained from a sample changes under the influence of a state change of the sample. In view of this, an approach might be contemplated in which a plurality of waveforms indicative of a plurality of intensity spectrums generated in order of time sequence are arranged to form a waveform array, and the waveform array is closely examined to thereby recognize a state change of the sample. However, for those not having thorough knowledge in the field of sample analysis, identifying a sample state change using this approach is not easy.

The present disclosure is directed to implementing a new approach for identifying a state change of a sample. Alternatively, the present disclosure is directed to enabling setting of an appropriate analysis period for a sample analysis.

SUMMARY OF THE INVENTION

A sample analysis apparatus according to an aspect of the present disclosure includes a creation unit that creates a plurality of one-dimensional maps based on a plurality of spectrums generated in order of time sequence by detecting electromagnetic waves from a sample, and further creates a contour map in the form of a two-dimensional map by arranging the plurality of one-dimensional maps in order of time sequence. The sample analysis apparatus further includes a display device that displays the contour map.

A sample analysis method according to an aspect of the present disclosure includes a step of generating a plurality of spectrums in order of time sequence by detecting electromagnetic waves from a sample, a step of creating a plurality of one-dimensional maps based on the plurality of spectrums, and a step of creating a contour map in the form of a two-dimensional map by arranging the plurality of one-dimensional maps in order of time sequence.

BRIEF DESCRIPTION OF THE DRAWINGS

Embodiment(s) of the present disclosure will be described based on the following figures, wherein.

DESCRIPTION OF THE INVENTION

(1) Overview of Embodiments

A sample analysis apparatus according to an embodiment comprises a creation unit and a display device. The creation unit creates a plurality of one-dimensional maps based on a plurality of spectrums generated in order of time sequence by detecting electromagnetic waves from a sample, and further creates a contour map in the form of a two-dimensional map by arranging the plurality of one-dimensional maps in order of time sequence. The display device displays the contour map.

When a state change occurs in the sample, the spectrum (i.e., the intensity spectrum) changes significantly. This change appears in the contour map as an "inconsistency" (e.g., a gap, shift, discontinuity, etc.). From the position of the inconsistency, the timepoint at which the state change occurred can be identified. Based on this, the sample analysis period can be set to before the timepoint of the state change. Here, the concept of electromagnetic wave includes a characteristic X-ray. In order to produce characteristic X-rays, an electron beam or X-ray is irradiated on the sample. As the above-noted contour map, a difference contour map described below may be created and displayed.

In an embodiment, the creation unit converts, for each spectrum, respective intensities constituting the spectrum into colors in accordance with a color conversion condition, and thereby creates the one-dimensional maps. The contour map is a color map. Configuring the contour map as a color map facilitates identification of the above-noted inconsistency.

In an embodiment, the electromagnetic waves are characteristic X-rays. During a measurement process in which an electron beam is continuously irradiated onto the sample, a plurality of spectrums are generated at uniform time intervals. The uniform time interval is designated by a user or is set automatically.

During the measurement process, the sample may be continuously applied with energy other than an electron beam, such as thermal energy, electric energy, or kinetic energy. Thermal energy includes cold energy.

A sample analysis apparatus according to an embodiment comprises a determination unit. The determination unit determines the timepoint at which the state change of the sample occurred based on the inconsistency included in the contour map. More specifically, the contour map has a time axis. The determination unit determines the timepoint at which the state change of the sample occurred, based on the position of the inconsistency on the time axis. A sample analysis apparatus according to an embodiment comprises a means for setting the sample analysis period as a period before the timepoint at which the state change of the sample occurred.

A sample analysis apparatus according to an embodiment comprises a difference contour map creation unit. The difference contour map creation unit creates a plurality of one-dimensional difference maps based on the plurality of spectrums, and further creates a difference contour map in the form of a two-dimensional difference map by arranging the plurality of one-dimensional difference maps in order of time sequence.

A sample analysis apparatus according to an embodiment comprises a waveform array creation unit. The waveform array creation unit creates a waveform array by arranging, in order of time sequence, a plurality of waveforms indicative of the plurality of spectrums. A sample analysis apparatus according to an embodiment comprises a spectroscope that detects characteristic X-rays, which are the electromagnetic waves, and generates the plurality of spectrums.

A sample analysis method according to an embodiment comprises a first step, a second step, and a third step. In the first step, a plurality of spectrums are generated in order of time sequence by detecting electromagnetic waves from a sample. In the second step, a plurality of one-dimensional maps are created based on the plurality of spectrums. In the third step, a contour map in the form of a two-dimensional map is created by arranging the plurality of one-dimensional maps in order of time sequence. The first step, the second step, and the third step may be carried out in parallel.

A sample analysis method according to an embodiment further comprises a fourth step and a fifth step. In the fourth step, the timepoint at which the state change of the sample occurred is determined by identifying the position of the inconsistency included in the contour map. In the fifth step, the sample analysis period is set as a period before the timepoint at which the state change of the sample occurred.

Sample analysis apparatuses according to embodiments are further described below.

A sample analysis apparatus according to an embodiment comprises an input means that receives input of a plurality of intensity spectrums obtained by spectrally dispersing electromagnetic waves generated from a sample, and a contour map display means that arranges the plurality of intensity spectrums in order of time sequence and displays a contour map.

A sample analysis apparatus according to an embodiment further comprises a temporal change display means that arranges, in order of time sequence, a plurality of temporal changes obtained from the plurality of intensity spectrums, and displays a temporal change contour map.

In an embodiment, the contour map is formed by arranging, in order of time sequence, a plurality of color maps (i.e., the plurality of one-dimensional maps) indicative of the plurality of intensity spectrums. Positions in each color map correspond to the respective energies (or wavelengths), and the color at each position in each color map indicates the intensity of the corresponding energy.

A sample analysis apparatus according to an embodiment further comprises: a means that arranges, in order of time sequence, a plurality of line graphs indicative of the plurality of intensity spectrums, and displays a line graph array; and a means that displays a corresponding position in the line graph array that corresponds to a selected position in the contour map, or a corresponding position in the contour map that corresponds to a selected position in the line graph array.

In an embodiment, the electromagnetic waves are characteristic X-rays generated at the sample irradiated with an electron beam. A sample analysis apparatus according to an embodiment further comprises a spectroscope that spectrally disperses the characteristic X-rays from the sample. The intensity spectrums are obtained using the spectroscope.

In an embodiment, the spectroscope comprises a diffraction grating and an X-ray camera. An obtaining means obtains the intensity spectrums by wavelength dispersive X-ray spectroscopy.

(2) Details of Embodiments

Figure 1:
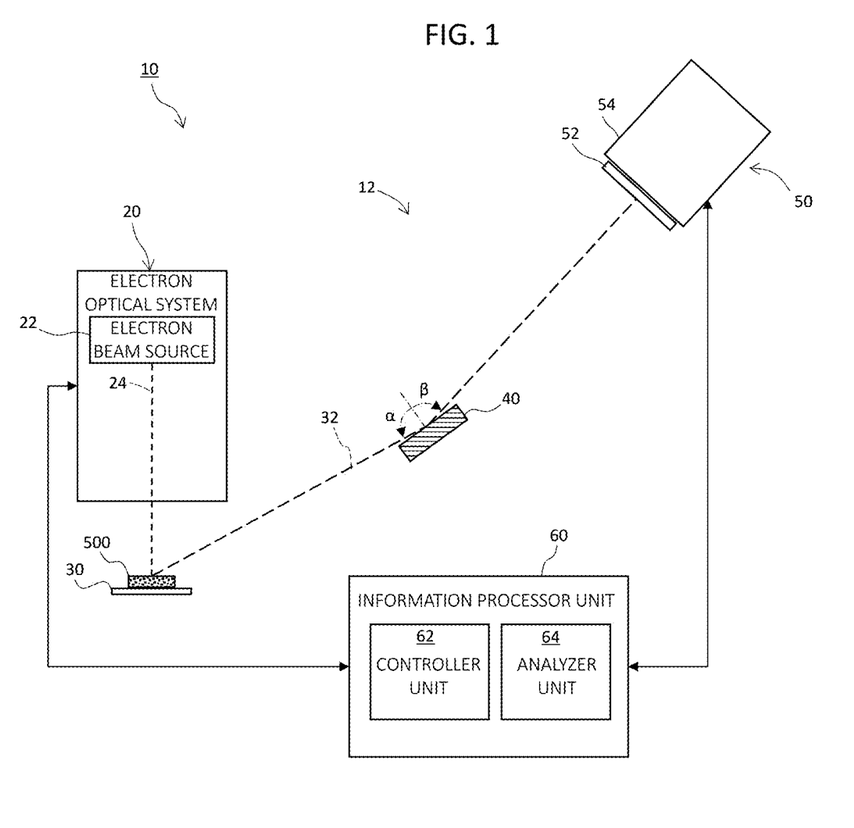
FIG. 1 is a schematic configuration diagram of a sample analysis apparatus according to an embodiment.

FIG. 1 is a diagram showing an overall configuration of a sample analysis apparatus 10 according to an embodiment.

The sample analysis apparatus 10 comprises an electron microscope, or more specifically, a scanning electron microscope. The sample analysis apparatus 10 includes a wavelength dispersive X-ray spectroscope 12, an electron optical system 20, a sample stage 30, and an information processor unit 60. The wavelength dispersive X-ray spectroscope 12 includes a diffraction grating 40 having grooves disposed at non-uniform intervals, and a detector unit 50.

The electron optical system 20 is a system for generating an electron probe. The electron optical system 20 includes an electron beam source 22 such as an electron gun, and the electron beam source 22 generates, as the electron probe, an electron beam 24. In the electron beam source 22, an accelerating potential for accelerating electrons is adjusted to generate electrons having a specified energy. Although not shown in drawing, the electron optical system 20 further includes a slit, a condenser lens, a scanning coil, an objective lens, and the like. The electron optical system 20 performs focusing, scanning, and the like of the electron beam 24.

The sample stage 30 is a component on which a sample 500 is placed. When the electron beam 24 is irradiated on the sample, characteristic X-rays 32 are generated at the sample 500. The characteristic X-rays are X-rays that are emitted during a process in which, in a situation where electrons in an inner shell orbital (i.e., an orbital at a deep position) of an atom constituting the sample 500 collided with and were ejected by the electron beam 24, electrons in an outer shell orbital (i.e., an orbital at a shallow position) transition to the inner shell orbital. In particular, soft X-rays are signals useful for analyzing the composition, bonding state, crystal structure, and the like of the sample. The characteristic X-rays 32 emitted from the sample 500 are collected by an X-ray focusing mirror (not shown in drawing) and directed to the diffraction grating 40. In the present embodiment, soft X-rays are detected as the characteristic X-rays. Soft X-rays are X-rays having, for example, an energy no greater than 2 keV, no greater than 450 eV, or no greater than 200 eV.

The diffraction grating 40 is an optical element (or a spectrally-dispersing element) that disperses the characteristic X-rays 32 by wavelengths. In other words, the output angle $\beta$ relative to the incident angle $\alpha$ has wavelength dependence due to the phenomenon of diffraction, and each characteristic X-ray component is output at an angle according to its wavelength. In this way, the incident characteristic X-rays 32 are resolved into components of the respective wavelengths; namely, components of the respective energies.

The detector unit 50 includes a CCD detector 52 and a CCD controller 54. The CCD detector 52 comprises a two-dimensional array of light receiving elements which receive X-rays and convert the X-rays into electric signals. By having the CCD detector 52 extending two-dimensionally, characteristic X-rays within a certain wavelength range (namely, within a certain energy range) can be received simultaneously or collectively. The CCD controller 54 controls the operation of the CCD detector 52, and also counts, separately for each of the light receiving elements, the number of electric signals output from the CCD detector 52. A number of counts over a set period of time (for example, 1 second, 5 seconds, 10 seconds, etc.) is obtained for each wavelength. In this way, an intensity spectrum of the characteristic X-rays 32 (i.e., a characteristic X-ray spectrum) is obtained.

The information processor unit 60 comprises hardware and software. The hardware includes a CPU (central processing unit), a memory, and the like. The software includes an OS (operating system), an application program, and the like. The information processor unit 60 may be composed of a PC (personal computer). The information processor unit 60 may be composed of a single device, or may alternatively be composed of a plurality of devices.

The information processor unit 60 includes a controller unit 62 and an analyzer unit 64. The controller unit 62 controls the electron optical system 20 and the detector unit 50. The analyzer unit 64 is a device that processes and analyzes a plurality of intensity spectrums (more precisely, a plurality of sets of intensity spectrum data) output in order of time sequence from the CCD controller 54.

During a measurement process, the sample 500 is continuously irradiated with the electron beam 24, and while doing so, the characteristic X-rays 32 emitted from the sample 500 are continuously detected. In this measurement process, detection periods are set sequentially at uniform time intervals. In other words, the measurement process is divided into a plurality of detection periods. For each detection period, an intensity spectrum is generated. That is, a plurality of intensity spectrums are generated corresponding to the respective detection periods.

Figure 2:
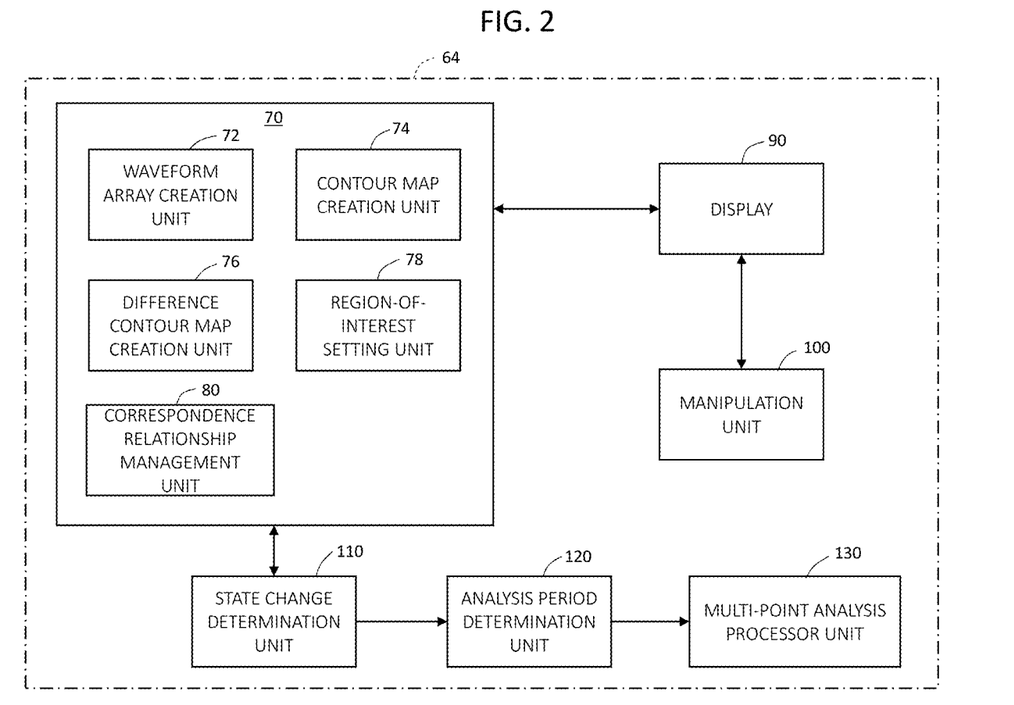
FIG. 2 is a block diagram showing an example configuration of an analyzer unit.

FIG. 2. is a block diagram showing the analyzer unit 64. The analyzer unit 64 includes a display processor unit 70, a display 90, a manipulation unit 100, a state change determination unit 110, an analysis period determination unit 120, and a multi-point analysis processor unit 130.

The display processor unit 70 performs processing for displaying images on the display 90. At each instance of receiving an intensity spectrum from the CCD controller 54, the display processor unit 70 processes the intensity spectrum in real time. Alternatively, after completion of a sequence of measurements, the display processor unit 70 collectively processes the plurality of intensity spectrums output from the CCD controller 54. The display processor unit 70 includes a waveform array creation unit (or line graph array creation unit) 72, a contour map creation unit 74, a difference contour map creation unit 76, a region-of-interest setting unit 78, and a correspondence relationship management unit 80.

The waveform array creation unit 72 creates a waveform (or line graph) for each intensity spectrum. This waveform is a waveform that indicates a string of intensities constituting an intensity spectrum. The horizontal axis of the waveform is the wavelength axis (or energy axis), and the vertical axis of the waveform is the intensity axis. A plurality of waveforms are displayed while being arranged next to each other in order of time sequence. At that time, display starting points for the respective waveforms are sequentially shifted in the horizontal direction and the vertical direction.

The contour map creation unit 74 creates a contour map based on the plurality of intensity spectrums. Specifically, the contour map creation unit 74 includes: a first creation unit that converts, in accordance with a first color conversion condition, each intensity spectrum into a corresponding one-dimensional map (or string of colors or color line); and a second creation unit that creates a contour map in the form of a two-dimensional color map by arranging, in order of time sequence, the plurality of one-dimensional maps generated from the plurality of intensity spectrums.

In the present embodiment, the CCD detector has a first axis corresponding to the wavelength dispersion direction, and a second axis orthogonal to the wavelength dispersion direction. For each wavelength, a plurality of detection signals are integrated in a direction parallel to the second axis. Meanwhile, the horizontal axis of the contour map is a light-receiving element number axis (i.e., an axis indicating the light-receiving element number), and the vertical axis of the contour map is the time axis. The light-receiving element number axis corresponds to the first axis of the CCD detector. The light-receiving element number axis is also an axis corresponding to a wavelength axis (or energy axis). However, in the present embodiment, the scale of the light-receiving element number axis and the scale of the wavelength axis are different.

In the contour map, temporal changes in intensity spectrum shape are expressed as color changes. When the intensity spectrum shape suddenly changes in accordance with a state change of the sample, there results an abrupt change or inconsistency in the color pattern of the contour map. From the position of the inconsistency, the timepoint of occurrence of the sample state change is identified.

When creating the contour map, contour lines may be drawn. For the creation of the contour map, various algorithms can be employed.

As explained above, in the present embodiment, for each spectrum, a string of intensities constituting the intensity spectrum is converted into a one-dimensional map in the form of a string of colors. Further, a contour map is created in the form of a two-dimensional color map by arranging, in order of time sequence, the plurality of one-dimensional maps created from the plurality of intensity spectrums.

The difference contour map creation unit 76 creates a difference contour map that indicates temporal changes of the intensity spectrums. Specifically, the difference contour map creation unit 76 includes: a first creation unit that converts, in accordance with a second color conversion condition, each intensity spectrum into a corresponding one-dimensional difference map (or string of colors or color line); and a second creation unit that creates a difference contour map by arranging the plurality of one-dimensional difference maps in order of time sequence.

Typically, when creating the one-dimensional difference map, a difference between an intensity spectrum of a certain timepoint and an intensity spectrum of a directly preceding timepoint is calculated as a difference data. Difference data are data that directly indicate a temporal change in intensity spectrum at each timepoint. In generating the difference data, a difference between an intensity spectrum of a certain timepoint and a reference intensity spectrum (e.g., an initial intensity spectrum) may be calculated.

In the difference contour map, the temporal changes of the intensity spectrums are emphasized, so that an inconsistency indicative of a sample state change can be easily identified. Meanwhile, it is noted that the difference contour map as a whole includes many small color changes. If any difficulty in identifying the above-noted inconsistency is caused due to such color changes, the difference contour map may be smoothed in the time axis direction. For this smoothing process, techniques such as polynomial interpolation, moving average, and the like can be employed.

The region-of-interest setting unit sets a user-instructed region as a region of interest, in accordance with a manipulation performed by a user via the manipulation unit 100. For example, a region of interest may be set with respect to a waveform array, or may be set with respect to a contour map or a difference contour map. The set region of interest may, for example, be enlarged and displayed.

The correspondence relationship management unit 80 manages the correspondence relationship between the line graph array and the contour map (and difference contour map). Here, the correspondence relationship refers to a relationship of correspondence between scales of two horizontal axes. For example, when a region of interest is set with respect to the waveform array, the correspondence relationship management unit 80 calculates a position in the contour map that corresponds to the position of the region of interest. Subsequently, in accordance with the calculated position, the correspondence relationship management unit 80 identifies and displays the region of interest on the contour map. Further, for example, when a specific portion of the contour map is pointed at with a pointer, the correspondence relationship management unit 80 calculates a position in the waveform array that corresponds to the pointed position. Then, in accordance with the calculated position, the correspondence relationship management unit 80 points out the corresponding position in the waveform array using a different pointer.

The display 90 displays a manipulation screen, an analysis screen, or the like. The display 90 displays the waveform array, contour map, and difference contour map created by the display processor unit 70.

The manipulation unit 100 corresponds to a touchscreen function provided in the display 90, or alternatively, comprises devices such as a keyboard and a mouse. A user manipulates the manipulation unit 100 while looking at the displayed content on the manipulation screen and the analysis screen displayed on the display 90.

The state change determination unit 110 determines, in the contour map, an inconsistency indicative of a state change of the sample. From the position of the inconsistency on the time axis of the contour map, the state change determination unit 110 identifies the timepoint at which the sample state change occurred. The timepoint at which the sample state change started may be identified. For example, the state change determination unit 110 is constituted with a machine-learning-based image analyzer. This image analyzer uses a machine-learned algorithm to identify one or more inconsistencies included in the contour map. For example, a marker indicating the determined position may be displayed on the contour map or the waveform array to thereby notify a user of the timepoint at which a state change of the sample 500 occurred.

The analysis period determination unit 120 sets an analysis period to before the timepoint of state change. For example, in a case where it is determined by a user or the state change determination unit 110 that a significant state change occurred at a certain time, the analysis period is set to before that time. In that case, a plurality of intensity spectrums belonging in the analysis period serve as the objects of analysis. Modified embodiments may also be contemplated, such as an embodiment in which the analysis period is set to after the timepoint of state change, and an embodiment in which the analysis period is set to between a plurality of timepoints of state change.

The multi-point analysis processor unit 130 is a unit which, in a case where scanning of the electron beam over the sample 500 is carried out, applies the processes according to the present embodiment to each analysis point in the scan path. With this arrangement, spatial extent of a state change can be recognized. For example, regarding a plurality of analysis points disposed in a two-dimensional arrangement, timepoints of state change may be identified individually. Further, an area in which a state change is occurring at a certain timepoint may be distinguished from other areas. In that case, integration of the intensity spectrums may be performed within the area in which the state change is occurring. Furthermore, a state change at a certain analysis point and a state change at another analysis point may be compared.

Next, a first display example is described by reference to FIG. 3.

On the display 90, a waveform array 140, a contour map 160, and a difference contour map 180 are displayed. It is also possible to display only the contour map 160 or only the difference contour map 180.

The waveform array 140 is composed of a plurality of waveforms 142, 144, 146 arranged in the vertical direction. As indicated by the slanted time axis t, display starting positions of the waveforms 142, 144, 146 are shifted stepwise in the horizontal and vertical directions. The shift pitch in the horizontal direction is denoted by Δx, while the shift pitch in the vertical direction is denoted by Δy. Each of the waveforms 142, 144, 146 is a waveform that indicates an intensity spectrum. During a measurement process, a plurality of detection periods are set at uniform time intervals, and an intensity spectrum is generated separately for each detection period. The waveform array 140 is an expression of a plurality of intensity spectrums in the form of the plurality of waveforms 142, 144, 146.

For each waveform 142, 144, 146, the horizontal axis is the wavelength axis (or energy axis). FIG. 3 shows a horizontal axis A1 (whose unit is eV) representing a plurality of horizontal axes. For each waveform 142, 144, 146, the vertical axis A2 is the intensity axis.

In the contour map 160, the horizontal axis B1 corresponds to the first axis of the CCD detector; in other words, the horizontal axis B1 is the light-receiving element number axis. While this axis B1 corresponds to the wavelength axis (or energy axis), the scale of the light-receiving element number axis in the contour map 160 differs from the scale of the wavelength axis of the waveform array. In FIG. 3, the correspondence relationship between these two axes is indicated by lines 150, 152, 154. Naturally, it is alternatively possible to configure the two scales to coincide exactly with each other.

In the contour map 160, the vertical axis B2 is an axis indicating the order of sequence in which the intensity spectrums were obtained, and is therefore the time axis. As described above, the contour map 160 is composed of a plurality of one-dimensional maps arranged in order of time sequence along the vertical axis. Each of the one-dimensional maps is composed of a string of colors generated in accordance with a first color conversion condition. Each string of colors is composed of a plurality of colors arranged along the light-receiving element number axis. From a position on the vertical axis B2, the timepoint at which an intensity spectrum was obtained can be identified. The numerical values labeled along the vertical axis B2 represent the one-dimensional map number or the time elapsed from the start of measurement.

The color bar C shows the first color conversion condition, and specifically represents the relationship between intensity change and color change. The color bar C has an intensity axis C1. The continuous color changes in the color bar C include colors of blue, green, yellow, and red (see C2). Each of the intensity spectrums may be a spectrum standardized using a reference spectrum or a reference value.

The difference contour map 180 is composed of a plurality of one-dimensional difference maps arranged in order of time sequence. A single one-dimensional difference map is calculated for every pair of adjacent one-dimensional maps. The horizontal axis D1 of the difference contour map 180 is the light-receiving element number axis, as with the horizontal axis B1 of the contour map 160. The vertical axis D2 of the difference contour map 180 is the time axis, as with the vertical axis B2 of the contour map 160.

The color bar E represents the second color conversion condition, and specifically represents the relationship between difference change and color change. The color bar E has an intensity axis E1. The continuous color changes in the color bar E include colors of blue, green, yellow, and red (see E2).

Figure 3:
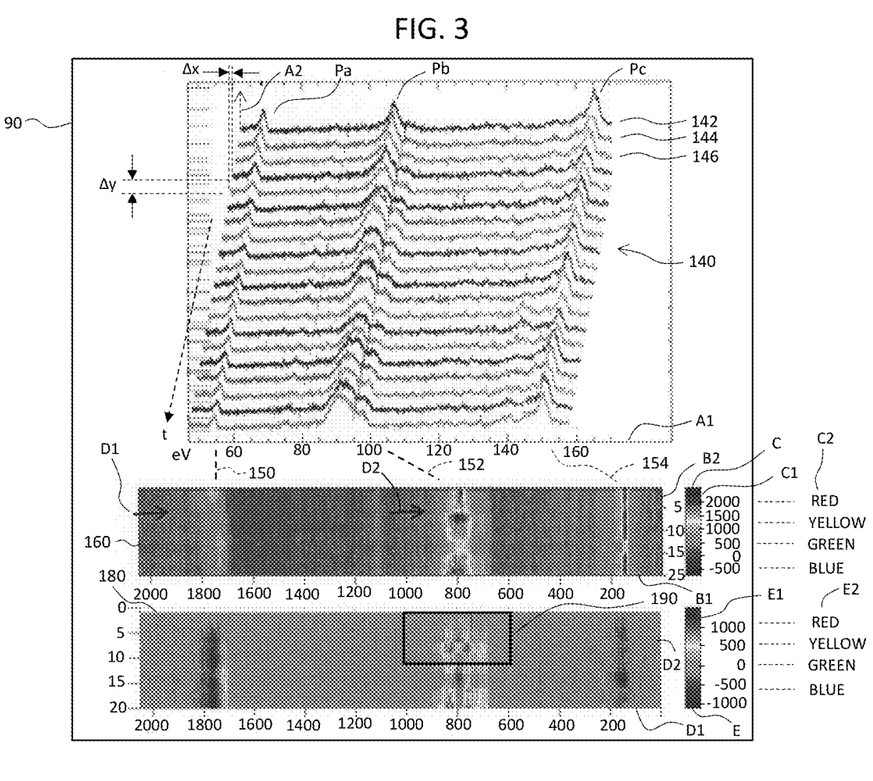
FIG. 3 shows a first display example.

In the example shown in FIG. 3, the waveform array 140 is composed of the plurality of intensity spectrums 142, 144, 146 arranged in order of time sequence. The waveform array 140 has a format referred to as a waterfall plot.

In embodiments, an entire intensity spectrum can be obtained simultaneously with a CCD detector. For this reason, in general, an ample amount of time is often spent for a single process of obtaining an intensity spectrum. However, if an intensity spectrum is obtained in such a manner, it cannot be determined at which timepoint a damage occurred in the sample; i.e., at which timepoint a state change of the sample was generated. Accordingly, in the present embodiment, a measurement process is divided into a plurality of detection periods having relatively short time cycles, and an intensity spectrum is obtained in each detection period.

In FIG. 3, the plurality of waveforms 142, 144, 146 constituting the waveform array 140 generally include three peaks Pa, Pb, Pc. It is observed that these peaks Pa, Pb, Pc change over an elapse of time. This change is caused mainly due to thermal damage generated in connection with continuous irradiation of an electron beam.

It is desired that an analysis of a sample be performed regarding the sample before receiving any thermal damage. For this reason, it is necessary to recognize at which time thermal damage was received. However, it is difficult to clearly identify the timepoint of thermal damage generation by reference to the waveform array 140 of FIG. 3.

In contrast, in the contour map 160, regarding the peaks Pa and Pb, color pattern discontinuities (namely, inconsistencies) are observed in the vicinity of the one-dimensional map obtained sixth in order of sequence, as indicated by arrows D1, D2. Since the contour map 160 is shown in black and white in FIG. 3, the inconsistency indicated by the arrow D1 does not appear very clearly. On the other hand, regarding the peak Pb, a sudden broadening of the peak width is clearly shown, as indicated by the arrow D2. From the position of the inconsistencies on the time axis B2, the timepoint at which a state change of the sample occurred is identified. In actual practice, the contour map is displayed on the display as a color map, and any inconsistency included therein is identified by the user.

In the difference contour map 180, the sample state change similarly appears as a color change. Here, referring to the peak Pb, a decrease in the peak top value and a broadening of the peak width are observed in the vicinity of the one-dimensional difference map obtained sixth in order of sequence.

Accordingly, the user can recognize the temporal change in the intensity spectrums by referring to the contour map 160 and the difference contour map 180. Meanwhile, the state change determination unit shown in FIG. 2 automatically recognizes the sample state change. When the timepoint at which the state change occurred is identified by the user or identified automatically, the analysis period determination unit sets the analysis period to before the timepoint of state change.

In FIG. 3, a region of interest 190 is set on the contour map 180 by the user. In this case, images shown in FIG. 4 may be displayed, for example.

Figure 4:
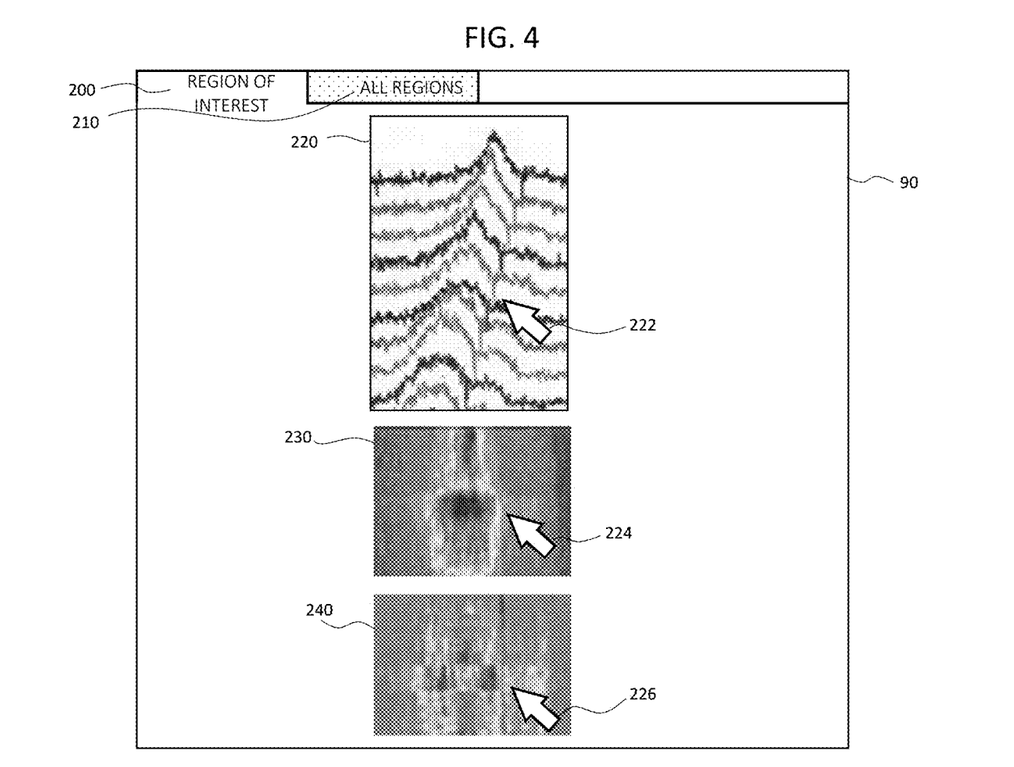
FIG. 4 shows a second display example.

FIG. 4 shows a second display example. On the display 90, a window 200 for a region of interest is displayed over a window 210 for all regions.

In the window 200, there are displayed a region of interest 220 included in the waveform array, a region of interest 230 included in the contour map, and a region of interest 240 included in the difference contour map. Although not shown in FIG. 4, a plurality of coordinate axes, a plurality of color bars, and the like are also displayed in actual practice.

Within the window 200, three pointers 222, 224, 226 are displayed. These pointers respectively point to a particular position on the horizontal axis in the region of interest 220, a particular position on the horizontal axis in the region of interest 230, and a particular position on the horizontal axis in the region of interest 240. When any one of the pointers 222, 224, 226 is moved, the other two pointers move in conjunction with the moved one of the pointers. This arrangement facilitates comparative observation of the plurality of corresponding regions of interest.

In the present embodiment, the waveform array, the contour map, and the difference contour map are all displayed on the same screen, as shown in FIG. 3. Alternatively, any one of the foregoing may be displayed alone on a screen. It may be configured such that an image to be displayed can be selected by the user.

In the above-described configuration, an energy dispersive X-ray spectroscope may be used in place of the wavelength dispersive X-ray spectroscope including the CCD detector. Alternatively, a different type of X-ray spectroscope may be used. The object of detection may be X-rays including those other than soft X-rays, or may be X-rays other than soft X-rays. Electromagnetic waves other than X-rays may serve as the object of detection. Further, the sample may be irradiated with an X-ray instead of an electron beam. The above-described configuration may be applied to an apparatus which processes intensity spectrums and which does not include an X-ray spectroscope.

Characteristic X-rays from the sample may be detected while the sample is continuously applied with thermal energy, electric (or magnetic) energy, or kinetic energy. For example, the configuration according to the present embodiment may be employed for a case in which a state of a sample is to be observed while the sample is being heated or cooled. Further, the configuration according to the present embodiment may be employed for a case in which a state of a sample is to be observed while a voltage, an electric current, an electric field, a magnetic field, or the like is applied to the sample. Still further, the configuration according to the present embodiment may be employed for a case in which a state of a sample is to be observed while a tensile force or a pressure is applied to the sample.

The invention claimed is:

1. A sample analysis apparatus, comprising:
   a creation unit which creates a plurality of one-dimensional maps based on a plurality of spectrums generated in order of time sequence by detecting electromagnetic waves from a sample, and which further creates a contour map in two-dimensional map form by arranging the plurality of one-dimensional maps in order of time sequence; and
   a display device which displays the contour map.

2. The sample analysis apparatus according to claim 1, wherein
   the creation unit converts, for each of the spectrums, respective intensities constituting the spectrum into colors in accordance with a color conversion condition, and thereby creates the one-dimensional maps, and
   the contour map is a color map.

3. The sample analysis apparatus according to claim 1, wherein
   the electromagnetic waves are characteristic X-rays, and during a measurement process in which an electron beam is continuously irradiated on the sample, the plurality of spectrums are generated at uniform time intervals.

4. The sample analysis apparatus according to claim 3, wherein during the measurement process, thermal energy, electric energy, or kinetic energy, which is energy other than the electron beam, is continuously applied to the sample.

5. The sample analysis apparatus according to claim 1, further comprising
   a determination unit that determines a timepoint at which a state change of the sample occurred based on an inconsistency included in the contour map.

6. The sample analysis apparatus according to claim 5, wherein
   the contour map has a time axis, and
   the determination unit determines the timepoint at which the state change of the sample occurred based on a position of the inconsistency on the time axis.

7. The sample analysis apparatus according to claim 6, further comprising
   a means for setting a sample analysis period as a period before the timepoint at which the state change of the sample occurred.

8. The sample analysis apparatus according to claim 1, further comprising
   a difference contour map creation unit that creates a plurality of one-dimensional difference maps based on the plurality of spectrums, and further creates a difference contour map in a form of a two-dimensional difference map by arranging the plurality of one-dimensional difference maps in order of time sequence.

9. The sample analysis apparatus according to claim 1, further comprising
   a waveform array creation unit that creates a waveform array by arranging, in order of time sequence, a plurality of waveforms indicative of the plurality of spectrums.

10. The sample analysis apparatus according to claim 1, further comprising
    a spectroscope that detects characteristic X-rays, which are the electromagnetic waves, and generates the plurality of spectrums.

11. A sample analysis method, comprising:
    a step of generating a plurality of spectrums in order of time sequence by detecting electromagnetic waves from a sample;
    a step of creating a plurality of one-dimensional maps based on the plurality of spectrums; and
    a step of creating a contour map in two-dimensional map form by arranging the plurality of one-dimensional maps in order of time sequence.

12. The sample analysis method according to claim 11, further comprising:
    a step of determining a timepoint at which a state change of the sample occurred based on a position of an inconsistency included in the contour map; and
    a step of setting a sample analysis period as a period before the timepoint at which the state change of the sample occurred.

* * * * *